(12) United States Patent
Wu

(10) Patent No.: US 11,006,178 B2
(45) Date of Patent: May 11, 2021

(54) MULTI-ACCOUNT PERSONALIZED ARTIFICIAL INTELLIGENCE TV INTERFACE AND SYSTEM THEREOF

(71) Applicant: Ovomedia Creative Inc., Taipei (TW)

(72) Inventor: Yu-Shun Wu, Taipei (TW)

(73) Assignee: OVOMEDIA CREATIVE INC., Taipei (TW)

( * ) Notice: Subject to any disclaimer, the term of this patent is extended or adjusted under 35 U.S.C. 154(b) by 0 days.

(21) Appl. No.: 16/414,612

(22) Filed: May 16, 2019

(65) Prior Publication Data

US 2020/0366961 A1 Nov. 19, 2020

(51) Int. Cl.
| | |
|---|---|
| *G06N 5/04* | (2006.01) |
| *H04N 21/466* | (2011.01) |
| *H04N 21/475* | (2011.01) |
| *H04N 21/422* | (2011.01) |
| *H04N 21/431* | (2011.01) |

(52) U.S. Cl.
CPC ........... *H04N 21/4668* (2013.01); *G06N 5/04* (2013.01); *H04N 21/42201* (2013.01); *H04N 21/4314* (2013.01); *H04N 21/4751* (2013.01)

(58) Field of Classification Search
CPC ......... H04N 21/4668; H04N 21/42201; H04N 21/4314; H04N 21/4751; G06N 5/04
USPC .......................................................... 725/27
See application file for complete search history.

(56) References Cited

U.S. PATENT DOCUMENTS

| | | | | |
|---|---|---|---|---|
| 2011/0282782 A1* | 11/2011 | Kumar | ................... | G06Q 40/06 705/39 |
| 2014/0229987 A1* | 8/2014 | Yates | ................. | H04N 21/4314 725/40 |

FOREIGN PATENT DOCUMENTS

| | | |
|---|---|---|
| CN | 102760060 A | 10/2012 |
| CN | 108920577 A | 11/2018 |

* cited by examiner

*Primary Examiner* — Nathan J Flynn
*Assistant Examiner* — Caroline Somera
(74) *Attorney, Agent, or Firm* — Sinorica, LLC

(57) ABSTRACT

The present invention discloses a multi-account personalized artificial intelligent TV interface and system thereof for providing a user to perform software and/or hardware operations. The step (a) is to provide a single layer of work page; and step (b) is on the work page to form an account block and a content block associated with the account block; step (c) is for the user to switch the account block to display the content block corresponding to the account block; and step (d) is to execute the account block or the content block to generate a result content on the work page; and the step (e) is to create new content block or renew the account block and the content block by detecting the result content escaping from the work page. A recommendation content based on a data calculated by artificial intelligence is feedbacked to the user.

9 Claims, 4 Drawing Sheets

MULTI-ACCOUNT PERSONALIZED ARTIFICIAL INTELLIGENCE TV INTERFACE AND SYSTEM THEREOF

FIELD OF THE INVENTION

The present invention is related to the technical field of a multimedia application, in particular to a multi-account personalized artificial intelligence TV interface and a system thereof applied on the TV screen.

BACKGROUND OF THE INVENTION

An operation of conventional TV service is merely through a channel option and a volume adjustment performed by a remote controller. For every member of the family (called a user), there is actually no difference, e.g. a content watched by a previous user will be inherited by every member.

With the evolution of the times, besides a live channel, the video-on-demand program has also been added, and the user is free to choose the program content that suits themselves. However, although the flexibility for choosing program content is increased, it is still impossible to distinguish the difference between every user.

In order to solve this problem, the prior art provides each user to log in a pre-registered account before entering the live channel or the video-on-demand program in order to distinguish different users. However, in the process of changing the user, a process through an account logout, an account login, waiting for downloading a data associated with a new login account, etc. is needed to complete a switch of the account. In other words, each user needs to pass in and out the different pages. For each user, although it is possible to distinguish the user, it is very inconvenient for each user to have a round-trip confirmation and switch between the different pages.

The existing TV service mainly provides a single broadcast system of simple live broadcast or simple on-demand. When a choice of live broadcast platform or on-demand platform is performed in the single broadcast system, there is still a need for performing switch in the different pages, which is very inconvenient for the user in an aspect of the operation.

In view of this, a multi-account personalized artificial intelligence TV interface and a system thereof are provided in the present invention in order to solve the problems of the prior art, such as non-personalized pages, multi-page switch operations, simple live broadcast or on-demand broadcast.

SUMMARY OF THE INVENTION

The first objective of the present invention is to provide a multi-account personalized artificial intelligence TV interface with an objective providing the user to perform an operation of at least one of software and hardware.

The second objective of the present invention is to provide an easy and simple switch for multi-account in the same layer of work page based on the multi-account personalized artificial intelligence TV interface mentioned above, and drive an artificial intelligence to recommend a recommendation content associated with an account based on a viewing history and an operational behavior of the account.

The third objective of the present invention is to provide a function presenting a personalized content and a message of the aforementioned account based on the selected account in accordance with the multi-account personalized artificial intelligence TV interface mentioned above.

The fourth objective of the present invention is to realize an objective performing fast switch between multi accounts through a switching signal based on the multi-account personalized artificial intelligence TV interface mentioned above.

The fifth objective of the present invention is to provide an account block, a content block, etc. based on the multi-account personalized artificial intelligence TV interface mentioned above, such that the user executes the account block and/or the content block.

The sixth objective of the present invention is to generate a recommendation content by an executing result thereof after the plurality of blocks are executed based on the multi-account personalized artificial intelligence TV interface mentioned above, and the recommendation content could be optionally displayed in the account block or the content block, such that the user can understand the block content, a viewing progress, a recommendation information, etc. easily.

The seventh objective of the present invention is to automatically recommend a suitable content (such as a data, a videos, a music, web links, etc.) to the user of the account block through a server in accordance with a behavior data (such as an operation behavior, etc.), a personal data (such as an age, a gender, a preference, etc.) of the user or a viewing content classification (or label) based on the multi-account personalized artificial intelligence TV interface mentioned above, and the recommendation content mentioned above may be obtained from a database of hardware manufacturers, content providers themselves, advertising partners, content partners, community partners, shopping partners, etc. by an internet communication protocol.

The eighth objective of the present invention is to be capable of watching an immediate program content of live channel in the account block such that the user may also optionally switch the other live channel in the same account block based on the multi-account personalized artificial intelligence TV interface mentioned above. Additionally, when the user switches to the other account block in a single layer of the work page, switching of the content block will also be performing with the switched account block. Meanwhile, the switched account block will also display the content of the live channel thereof. The content of live channel mentioned above may also be the last view channel, a recommended channel, a system preset channel or a favorite live channel, etc. of the switched account block.

The ninth objective of the present invention is to mutually recommend a content of its own block to another block or to renew or to be recommended another block content with the other block content between each one of the blocks by the server based on the operation behavior of each one of the blocks in the account block in accordance with the multi-account personalized artificial intelligence TV interface mentioned above.

The tenth objective of the present invention is to provide a multi-account personalized artificial intelligence TV system, such that the associated content is directly and simply recommended to the user by the multi-account personalized interface, in order to realize the multi-account personalized artificial intelligence TV interface.

In order to achieve the above and other objectives, the present invention provides a multi-account personalized artificial intelligence TV interface used for providing a user to perform a software operation and/or a hardware operation, the multi-account personalized artificial intelligence TV interface comprises step S1: providing a single layer of work page; step S2: forming a plurality of graphical blocks on the work page, wherein the plurality of graphical blocks are further divided into an account block and a content block, the account block is associated with the content block such that the content block is changed based on the content block, and the account block is associated with the user in order to identify the content block with the user; step S3: switching the account block by the user in order to display the content block corresponding to the account block; step S4: selecting the account block or the content block by the user in order to create a result content from executing the account block or the content block on the work page; and step S5: detecting the result content escaping from the work page, such that creating an association between the result content and the account block, and performing at least one of renewing the result content on the work page, renewing the account block and establishing an another content block optionally. Wherein a recommendation content based on a data calculated by artificial intelligence is capable of being provided to the user through at least one of the account blocks and the content block optionally. Furthermore, the data is at least one of behavior data obtained from personal data, a behavior data obtained from the operation of the account block and operation of the content block.

In order to achieve the above and other objectives, the present invention provides a multi-account personalized artificial intelligence TV system, comprising: a memory element, a processing element, an input element and an output element. A multi-account personalized artificial intelligence TV interface is stored by the memory element. The processing element is connected to the memory element. The multi-account personalized artificial intelligence TV interface is obtained from the memory element, and the multi-account personalized artificial intelligence TV interface is executed by the processing element in order to output a single layer of a work page. Wherein the work page forms at least one of an account blocks and a content block. The input element is connected to the processing element. A switching signal is generated by the input element and is outputted to the processing element in order to operate at least one of the account blocks and the content block. The output element is connected to the processing element. The work page is displayed by the output element. Wherein the account block is associated with the content block. The content block corresponding to the account block is displayed by the work page when the switching signal is switched to the account block, and the account block and the content block are executed by the processing element.

Compared with the prior art, the multi-account personalized artificial intelligence TV interface and the system thereof is provided by the present invention, especially the present invention provides the user such as watching the live channel, watching the on-demand video or executing an application (APP) on the TV screen. The present invention can provide multi accounts to be used on the work page. After switching to every account block, a corresponding block will be generated based on a personalized setting, viewing content and an operation behavior by every the account block, for example the block may be the recommendation content of a last viewed (or usually viewed) live channel or on-demand content, a last used (or usually used) application program, an usually viewed live content or on-demand content, an advertisement, a promotional message, a discount message, an ordering message, an user guide, etc.

Besides the user can perform fast switching between multi-account through such as a physical remote control or a portable electronic device with an installed virtual control program and utilizing a communication protocol (for example wireless fidelity (Wi-Fi), Bluetooth, infrared, etc.), and the user can also realize performing fast switching between multi account through a sensor such as a sound sensor, an image capturing device (for example capturing a gesture, a hand gesture, etc. of the user), a joystick, a keyboard (for example receiving a typed text and/or a rendered graphic, etc. of the user) or a mouse (for example receiving the typed text and/or the rendered graphic, etc. of the user).

In an embodiment, artificial intelligence can execute calculating, analyzing, estimating and recommending, etc., and the artificial intelligence can calculate the data in order to automatically perform a personalized recommendation term, and the artificial intelligence may be a server storing a local end or remote (or called "cloud").

In an embodiment, the user can transfer/redisplay a multi-account personalized artificial intelligence TV interface (be called for short "pre-interface") into another multi-account personalized artificial intelligence TV interface (be called for short "post-interface"), such that all associated blocks of the account block in the pre-interface could be fully redisplayed under a condition the post-interface with the same account block.

As mentioned above, because the pre-interface and the post-interface have both been provided with the same account block. Therefore the pre-interface and the post-interface can utilize a mutual synchronize (for example the personalized message of the same account block of the pre-interface and the post-interface is stored in the server), such that the same content or block in the post-interface (or in the pre-interface) could be obtained by the operation behavior in the pre-interface (or in the post-interface).

DETAILED DESCRIPTION OF THE PREFERRED EMBODIMENTS

In order to fully understand the objectives, features, and advantages of the present invention, the present invention will be described in detail with a description of the embodiments and the accompanying drawings.

In the present invention, "a" or "an" is used to describe the elements, parts and components described herein. This is done for convenience of description only and provides a general meaning to the scope of the invention. Therefore, unless clearly stated otherwise, the description should be understood to include one, at least one, and the singular also includes the plural.

In the present invention, the terms "comprising", "including", "having", "containing", or the likes are intended to encompass non-exclusive inclusions. For example, a component, structure, article, or device that contains a plurality element is not limited to such elements as listed herein but may include those not specifically listed but which are typically inherent to the component, structure, article, or device. In addition, the term "or" is used to mean an inclusive "or" rather than an exclusive "or" unless clearly stated to the contrary.

Figure 1:
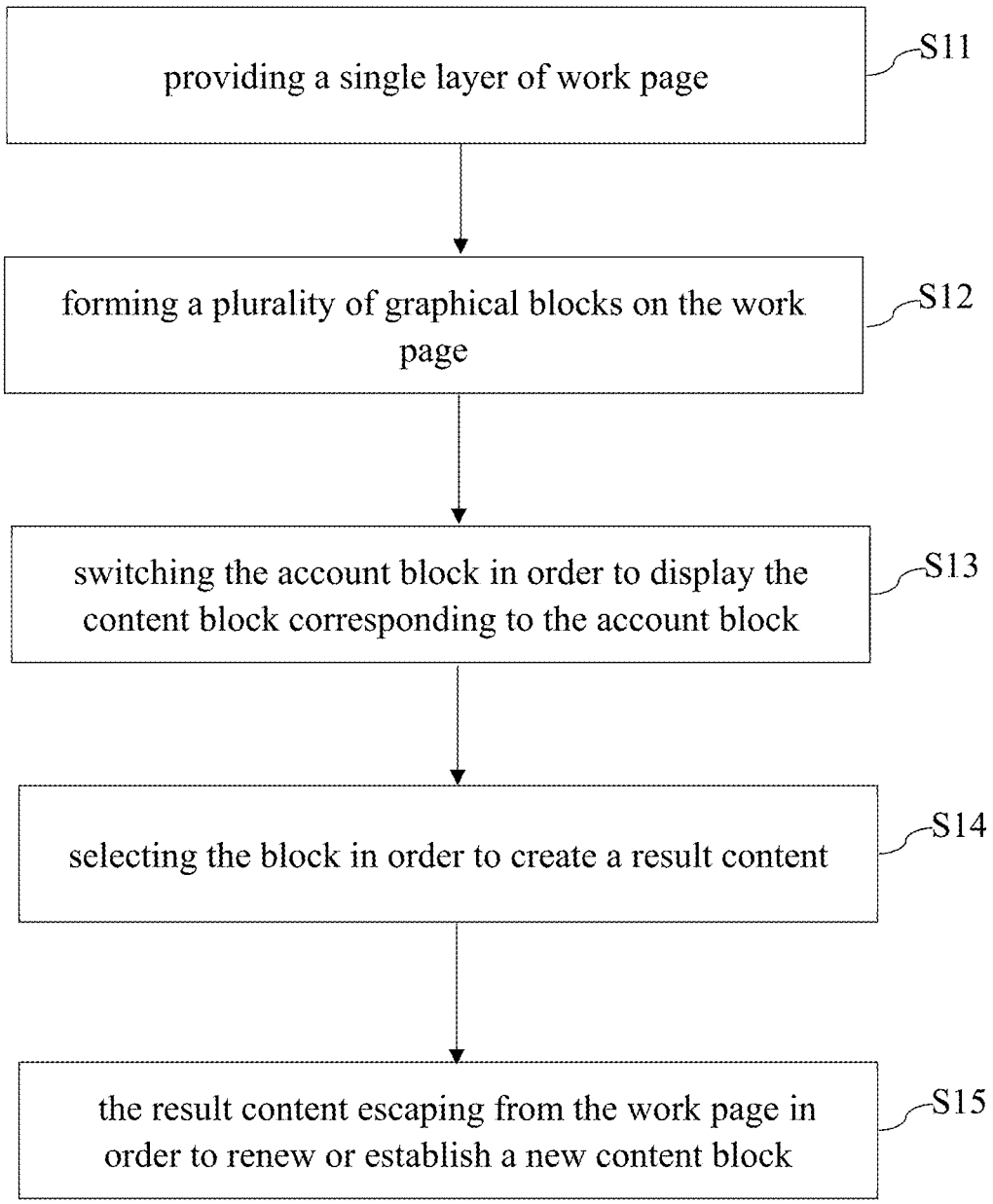
FIG. 1 is a flow schematic of a multi-account personalized artificial intelligence TV interface according to the first embodiment of the present invention.

Please refer to FIG. 1, it is a flow schematic view of a multi-account personalized artificial intelligence TV interface of a first embodiment in the present invention. In the FIG. 1, it is a multi-account personalized artificial intelligence TV interface. The interface is indicated to be a hardware interface, a software interface or the combination thereof herein. As far as the hardware interface is concerned, the hardware interface is indicated to be a communication coupling mechanism between hardware elements of information machine, i.e. television (TV), etc.; as far as the software interface is concerned, the software interface is indicated to be a communication bridge mechanism between software elements of information machine, i.e. television (TV), etc., the communication bridge mechanism presences between the divided software elements, and the communication is able to be performed through driving these elements by the software interface. In short, the multi-account personalized artificial intelligence TV interface of the present invention may be operated through performing software and/or hardware by a user. In the present embodiment, the multi-account personalized artificial intelligence TV interface is described by the software interface, for example.

Figure 2:
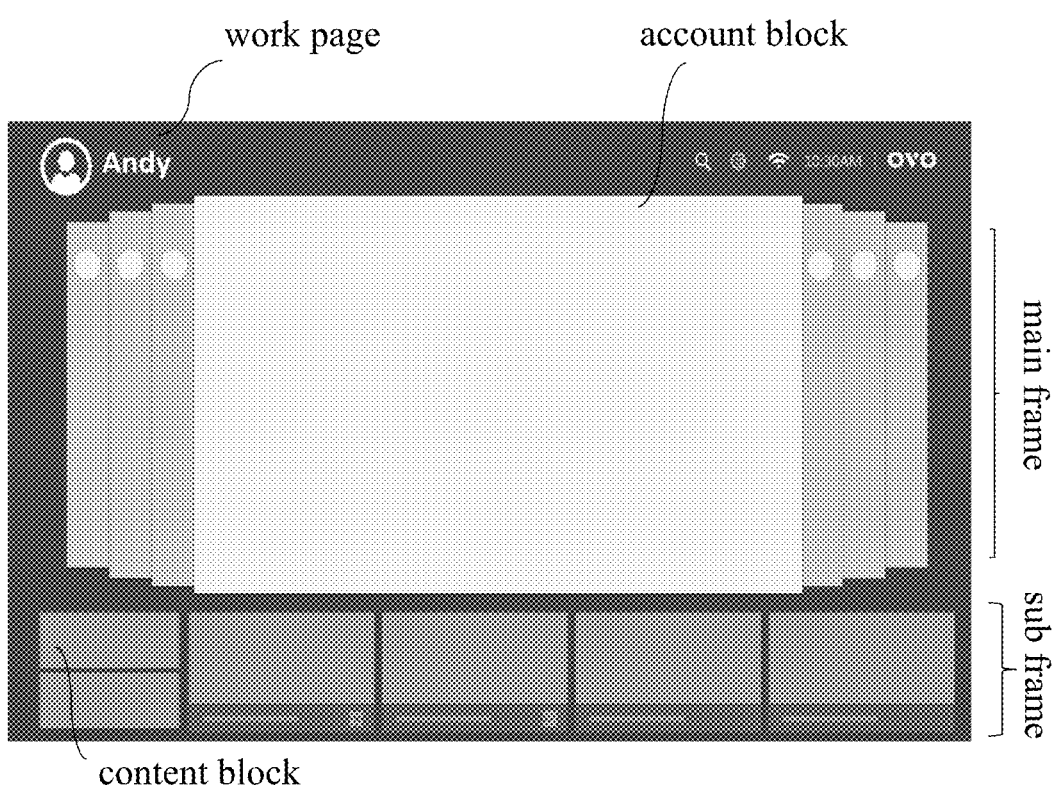
FIG. 2 is an interface schematic illustrating the multi-account personalized artificial intelligence TV interface according to FIG. 1 of the present invention.
Figure 3:
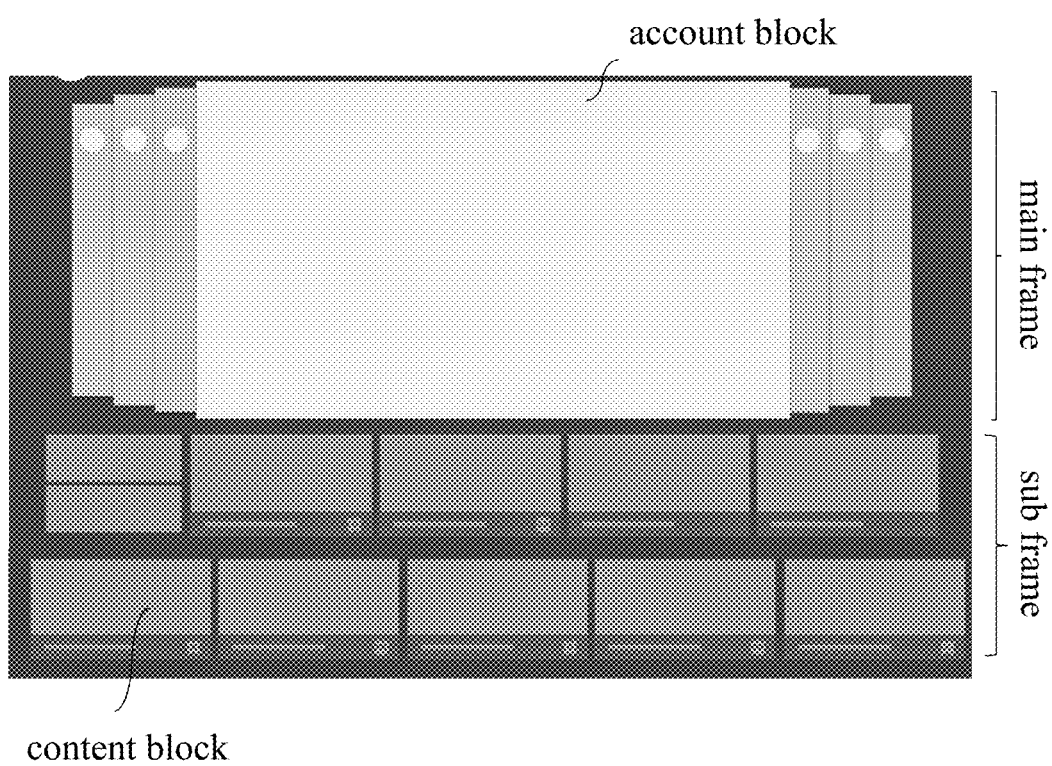
FIG. 3 is an interface schematic illustrating the multi-account personalized artificial intelligence TV interface according to FIG. 1 of the present invention.

An initial step S11 of the multi-account personalized artificial intelligence TV interface: providing a single layer of work page. For ease of explanation, mainframe, a sub-frame or a plurality of frames is defined in a single work page façade. Wherein, the mainframe may be used for setting up an account block in the following description, and the sub-frame may be used for setting up a content block in the following description. Both refer to FIG. 2 and FIG. 3, these are an interface schematic view of the multi-account personalized artificial intelligence TV interface in FIG. 1 of the present invention. In the FIG. 2, displaying the main frame and the sub-frame in a single layer of an operation page; when a proportion of the main frame and the sub-frame on a TV picture and in the single layer of operation page is operated by a controller, i.e. a remote controller, used by the user, for example, a picture as FIG. 3 in the same layer of the operation page is generated through moving the remote controller downward, such that more content blocks are displayed by the sub-frame, and the content block will be described later.

In the plurality of frame embodiments, a plurality of classification frame, for example a film classification, a TV drama classification, a children classification, a favorite classification, a variety classification, a game classification, a recommendation classification, etc., may be generated in the work page by the plurality of frame embodiments. A block arranging algorithm may be used to classify the foregoing classification into an associated classification frame based on the content of the content block.

It shall be noted that a size, a color, a shape or a style of a visual reminder or an audible alert with voice of the account block, the content block, etc. may be adjusted correspondingly by the user or the multi-account personalized artificial intelligence TV interface, such that the user's attention is caused. In another embodiment, it further comprises forming a common frame in the work page, such that an assigned content block is set up in the common frame by the user.

In the next step S12: forming a plurality of graphical blocks on the work page. In the present embodiment, the block is referred to be an area encircled on the work page, the size, a geometries, the color, a type, the style, a pattern or a drawing, etc. thereof may be defined in the area, and a function thereof may be addressed transferring, link providing, playing and information providing, etc. The plurality of patterned blocks may be further divided into an account block and a content block based on the function thereof. Wherein, the account block provides a switching function performed by the user. Besides the account block may be pre-formed and may be edited the setting thereof by the user, a pre-setting may be performed for the account block, for example, a family account block, a father account block, a mother account block, a children account block, etc. may be defined. In the other embodiment, increasing or decreasing in the account block may be performed by the user; and the content block is an application program, a message announcement, an instruction manual, a discount message, a piece of renewing information, etc. pre-setup by the multi-account personalized artificial intelligence TV interface. Wherein, besides the content block, may be pre-setup by an interface provider, the content block may be further generated through renewing, replacing, establishing. In the present embodiment, the content block is set in a condition that the account block without a deleted permission. But in the other embodiment, deleting and/or editing for the content block performed by the user of the account block may be also permitted based on a situation.

Because the work page is a single layer, the account block and the content block are in the same layer of the work page. It will be intuitive and simple for a switching process of the user. For example, the account block is associated with the content block, such that the content block is changed based on the account block, e.g. a corresponding content block will be presented by the multi-account personalized artificial intelligence TV interface based on a selected account block.

Therefore, the account block is associated with the user, and the multi-account personalized artificial intelligence TV interface is capable for identifying the account block as the user through switching the account block by the user, in order to realize that the user may switch multi-account in single work page, additionally a personalized content is provided or a personalized content block is edited based on a switched account.

In the following step S13: switching the account block by the user in order to display the content block corresponding to the account block. Therefore, following the step mentioned above, a personalized setting is presented by the content block based on the account block in this step after the account block is switched by the user. For example, the plurality of account block may be displayed in the main frame when a quantity of the user is plural in order to provide the user to perform switching between the pluralities of account blocks. Wherein an option of the plurality of account blocks may be performed with a switching type of left and right movement, an up-down movement, a movement along with directions, replacing and stacking by the plurality of account blocks. It shall be noted that the switching is executed by the switch type mentioned above through a switching signal received by the multi-account personalized artificial intelligence TV interface. Wherein the switching signal is created from a remote controller operation by the plurality of users, capturing a biological feature (i.e.

sound, image, fingerprint, voiceprint, iris, etc.) of the plurality of users and catching a movement (i.e. hand gesture, gesture, expression, etc.) of the plurality of users.

Then in the step S14: selecting the account block or the content block by the user in order to create a result content from executing the account block or the content block on the work page. In the present step, a plurality of operations of switching account, executing application program, etc. will be executed by the work page when the account block is selected, for example, in the switching account operation the switching by the user between the plurality of account blocks will be performed by the account block based on the operation of the user. Wherein, a live channel may be played by the account block directly, and the user may switch to another live channel in the live channel by a channel menu; in the other embodiment, a function the user performs a request based on a playing menu may be provided by the account block, too. In addition, a corresponding function may be replied by the content block based on a provided function thereof when the content block is selected. For example, the content block may be a music player application program, and the work page is transformed to be a result content of playing picture of the music player application program by the work page when the content block is executed, such that the user may perform a music option and music playing. It shall be noted that the playing picture may be embedded into the work page when the content block is executed in the other embodiment. Further in the other embodiment, besides the content block is executed a recommendation content (such as an announcement, the discount message, an advertisement, etc.) of the multi-account personalized artificial intelligence TV interface may also be received passively or requested actively by the content block. Or a recommendation content (such as the announcement, the discount message, the advertisement, etc.) of the other non-personalized artificial intelligence TV interface of the other application program, advertiser, etc. may also be received passively or requested actively by the content block.

In another embodiment, besides the account block, may be associated with the live channel, the content block may also be associated with the live channel, such that the user enters the live channel through the content block. Furthermore, in another embodiment, a picture generated by the live channel may be embedded into the channel menu (for example one or more link of the channel menu may be provided), such that the user may switch to another live channel in the live channel by the channel menu, and the live channel may appear in the work page.

Next in the step S15: detecting the result content escaping from the work page, such that creating an association between the result content and the account block and/or the content block and renewing the result content on the work page or establishing a new content block optionally. In the present step, if a condition the result content escaping from the work page is detected by the personalized artificial intelligent TV interface of the work page, for example an escaping reason may be a reason of application process fault, an escaping instruction the user gives, etc., and an association will be generated between the result content and the account block, such that the content block is established on the work page. In another embodiment, after the account block is associated the association may be recorded merely through the multi-account personalized artificial intelligent TV interface by the result content instead of renewing the content block or establishing the content block optionally on the work page.

Based on data, a recommendation content is provided to the user optionally through at least one of the account blocks and the content block by artificial intelligence. For example, a behavior data (such as an operation behavior, etc.) is capable of being obtained from a personal data (such as an age, a gender, a preference, etc.) and operation of at least one of the account blocks and the content block by the data.

For example, the artificial intelligence mentioned above is indicated to realize behavior model used for reasoning, knowledge, planning, learning, interflow, perception, movement, and manipulation of objects, etc. by an algorithm, e.g. interpreting an operating habit of the user and speculating a preference of the user, etc. from the behavior data. Furthermore, artificial intelligence may be set up at a local end or a server end of the multi-account personalized artificial intelligence TV interface. Based on a result calculated by the artificial intelligence, the recommendation content may be displayed in the account block and/or the content block by the multi-account personalized artificial intelligence TV interface, and an original content stored in the account block and/or the content block may be replacing or appearing or playing alternatively through an animation.

Besides the step mentioned above, the present invention further comprising a step: providing a registration page by the multi-account personalized artificial intelligence TV interface, such that one or more user may establish and edit the account block on the work page. Additionally, in another embodiment, a security verification mechanism (for example through a biometric identification verification, a text password verification, a graphic identification verification, etc.) used for performing an Authentication may also be set for the account block by the multi-account personalized artificial intelligence TV interface in order to ensure the privacy of the user, such that the plurality of user logins into the account block by the security verification mechanism in order to obtain the content block. In other words, the text password verification, the graphic identification verification, the biometric identification verification or the combination thereof is provided by the security verification mechanism.

Besides the step mentioned above, in order to the last executing content or a state of the block could be understood intuitively by the user in the block, the present invention further comprising a step: executing the result content of the account block and the content block, a timing escaping from the work page, capturing a figure of the result content corresponding to a timing, in order to display the figure onto the account block and the content block.

Besides the step mentioned above, in order to a block selected by the user may be attended by the user in the block intuitively, the present invention further comprising a step: optionally adjusting the size, the color, the shape or the style of the visual reminder or the audible alert with voice of the account block, the content block.

Besides the step mentioned above, for the reason that the account block and/or the content block may be arranged automatically in order to match a usage habit of the user, the present invention further comprising a step: arranging the account block and the content block on the work page based on a block arranging algorithm. Wherein, the block arranging algorithm is associated with a usage frequency or a time span for usage the user executes the content block.

Besides the step mentioned above and besides through a captured picture of the last usage or word by the user in the account block, the present invention further comprising a step: embedding an account mark associated with the user in the account block, for example, a doll map of family member, a doll map of someone in the family member, etc.

Besides the step mentioned above, the present invention further comprises a step: redisplaying/synchronize the content block and the recommend content associated with the account block in another personalized artificial intelligence TV interface through transferring the account block by the user in the other multi-account personalized artificial intelligence TV interface if possible. In other words, if the user uses the same account block, any blocks and contents associated with thereof may both be redisplayed and/or synchronized.

In an scenario for example, in an initiative usage process of certainly initialized multi-account personalized artificial intelligence TV interface (be called for short "pre-interface"), the user will be requested to perform registering (for example the register may request the user to provide an account, an Email, telephone number, etc.), such that the pre-interface is registered with the user. Then the user may use the personalized artificial intelligence TV interface. When the user wants to use the account block of pre-interface in a certain initialized or non-initialized multi-account personalized artificial intelligence TV interface (be called for short "post-interface"), the registered user data of the pre-interface (for example the account block and a personalized setting associated with thereof, etc.) may be login in the post-interface, and the content of the pre-interface may be further redisplayed in the post-interface. Additionally, in another implement aspect, every account block may also be transferred individually, and an individual transfer of the account block may be performed through binding or another registration method.

Figure 4:
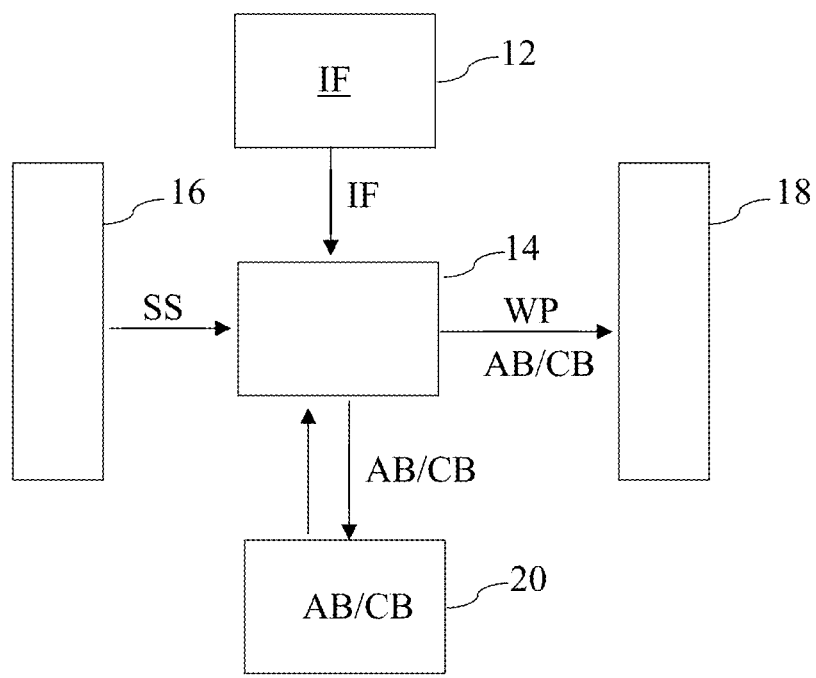
FIG. 4 is a block schematic of a multi-account personalized artificial intelligence TV interface according to the second embodiment of the present invention.

Refer to FIG. 4 together, it is a block schematic view of a second embodiment in the present invention. In FIG. 4, there is a multi-account personalized artificial intelligence TV system 10 comprising a memory element 12, a processing element 14, an input element 16 and an output element 18. Wherein an implement aspect of the multi-account personalized artificial intelligence TV system 10 may be an intelligence TV, multimedia box, etc.

The multi-account personalized artificial intelligence TV interface IF in such as the first embodiment mentioned above is stored by the memory element 12.

The memory element 12 is connected to the processing element 14. The multi-account personalized artificial intelligence TV interface IF is obtained from the memory element 12 by the processing element 14, and the multi-account personalized artificial intelligence TV interface IF is executed by the processing element 14, furthermore a single layer of the work page WP is output. Wherein, an account block AB and/or a content block CB is formed by the work page WP.

The processing element 14 is connected to an input element 16, such as a keyboard, a mouse, an infrared remote control, a Bluetooth remote control, a biometric feature capturing device, a camera, a microphone, etc. A switching signal SS is generated by the input element 16 and is output to the processing element 14, in order to operate an account block AB and/or a content block RB.

The processing element 14 is connected to an output element 18, for example, the output element 18 may be a display screen, a TV screen, a projector, etc. The work page WP is displayed by the output element 18. Wherein the account block AB is associated with the content block RB. When the switching signal SS is switched to the account block AB, the content block CB corresponding to the account block AB is displayed by the work page WP, and the account block AB and the content block CB are executed by the processing element 14.

In another embodiment, the multi-account personalized artificial intelligence TV system 10 further comprises a server element 20.

The server element 20 is connected to the processing element 14 through a communication protocol (for example a wireless communication protocol, a wired communication protocol or the combination thereof). The server element 20 is used for recording or collecting a behavior data executed and switched by the account block AB and the content block CB. For example, the first embodiment could be referred, the data is calculated/analyzed by artificial intelligence, such that a recommendation content is provided for the user in the account block AB and/or the content block CB.

It shall be noted that the multi-account personalized artificial intelligence TV system 10 is capable of being implemented in the multi-account personalized artificial intelligence TV interface of the first embodiment.

The present invention is disclosed with a preferred embodiment in the foregoing paragraphs. The embodiments described above are merely illustrative of the technical spirit and characteristics of the present invention, and the objects of the present invention can be understood by those skilled in the art and can be implemented as if the invention cannot be limited thereto. The scope of the patent, that is, the equivalent variations or modifications made by the present invention in the spirit of the invention, should still be included in the scope of the invention.

What is claimed is:

1. A multi-account personalized artificial intelligence TV interface used for providing a user to perform at least one of software operation and a hardware operation, a personal data is provided optionally by the user, the multi-account personalized artificial intelligence TV interface comprises:
   (a) providing a single layer of work page;
   (b) forming a plurality of graphical blocks on the work page, and the plurality of graphical blocks are further divided into an account block and a content block, the account block is associated with the content block such that the content block is changed based on the account block, and the account block is associated with the user in order to identify the account block with the user;
   (c) switching the account block by the user in order to display the content block corresponding to the account block;
   (d) selecting the account block or the content block by the user in order to create a result content from executing the account block or the content block on the work page;
   (e) detecting the result content escaping from the work page, such that creating an association between the result content and the account block, and performing at least one of renewing the result content on the work page, renewing the account block and establishing another content block optionally; and
   (f) providing a registration page such that the personal data is established and edited on the work page by the plurality of users in order to establish the account block, and a security verification mechanism is set by the account block such that the plurality of user logins the account block by the security verification mechanism in order to obtain the content block;
   wherein a recommendation content based on a data calculated by an artificial intelligence is provided to the user through at least one of the account block and the content block optionally, and the data is at least one of a behavior data obtained from personal data, a behavior data obtained from an operation of the account block and an operation of the content block.

2. The multi-account personalized artificial intelligence TV interface according to claim 1, further comprising displaying the plurality of account block when a quantity of the user is plural in order to provide the user to perform switching between the plurality of account blocks on the same work page, wherein an option of the plurality of account block is performed with at least one of switching types of a left and right movement, an up-down movement, a movement along any directions, replacing and stacking by the plurality of account blocks.

3. The multi-account personalized artificial intelligence TV interface according to claim 2, further comprising receiving a switching signal in order to execute the switching type, wherein the switching signal is created from at least one of remote controller operation by everyone of the plurality of users, capturing a biological feature of every one of the plurality of users and catching a movement of every one of the plurality of users.

4. The multi-account personalized artificial intelligence TV interface according to claim 1, further comprising executing the result content of at least one of the account block and the content block, and capturing a figure of the result content corresponding to a timing based on the timing escaping from the work page in order to display the figure onto at least one of the content block and the account block.

5. The multi-account personalized artificial intelligence TV interface according to claim 1, further comprising arranging a position of at least one of the account block and the content block in the work page based on an association level of a content of the account block and the content block with a block arranging algorithm, and a classification frame is further optionally established in the work page based on a property of the content block by the block arranging algorithm in order to classify the content blocks with the same property into the same classification frame, in addition, the classification frame is further optionally indicated to be a common frame by the block arranging algorithm in order to set up the content block assigned by the user.

6. The multi-account personalized artificial intelligence TV interface according to claim 1, further comprising a calculation used for executing at least one of an analyzing, an estimating and a recommendation by the artificial intelligence and through providing a server end to search and obtain the data.

7. The multi-account personalized artificial intelligence TV interface according to claim 1, further comprising transferring the account block in order to redisplay the content block and the recommendation content associated with the account block in another personalized artificial intelligence TV interface.

8. A multi-account personalized artificial intelligence TV system, comprising:
   a memory element storing a multi-account personalized artificial intelligence TV interface;
   a processing element connected to the memory element, the multi-account personalized artificial intelligence TV interface is obtained from the memory element, and the multi-account personalized artificial intelligence TV interface is executed by the processing element in order to output a single layer of a work page and output a registration page, wherein the work page forms at least one of an account block and a content block, and the registration page such that the personal data is established and edited on the work page by the plurality of users in order to establish the account block, and a security verification mechanism is set by the account block such that the plurality of user logins the account block by the security verification mechanism in order to obtain the content block;
   an input element connected to the processing element, a switching signal is generated by the input element and is outputted to the processing element in order to operate at least one of the account block and the content block; and
   an output element connected to the processing element, and the work page is displayed by the output element,
   wherein the account block is associated with the content block, the content block corresponding to the account block is displayed by the work page when the switching signal is switched to the account block, and the account block and the content block are executed by the processing element.

9. The multi-account personalized artificial intelligence TV system according to claim 8, further comprising a server element connected to the processing element through a communication protocol, a data is calculated by the server element, wherein the data is associated with at least one of the account block and the content block.

\* \* \* \* \*